(12) United States Patent
Gerlovin

(10) Patent No.: US 9,166,416 B2
(45) Date of Patent: Oct. 20, 2015

(54) METHOD FOR BALANCING CELLS IN BATTERIES

(75) Inventor: Mark Gerlovin, Lexington, MA (US)

(73) Assignee: Boston-Power, Inc., Westborough, MA (US)

( * ) Notice: Subject to any disclaimer, the term of this patent is extended or adjusted under 35 U.S.C. 154(b) by 463 days.

(21) Appl. No.: 13/587,023

(22) Filed: Aug. 16, 2012

(65) Prior Publication Data

US 2013/0057198 A1 Mar. 7, 2013

Related U.S. Application Data

(60) Provisional application No. 61/530,595, filed on Sep. 2, 2011.

(51) Int. Cl.
*H02J 7/00* (2006.01)
*H02J 1/12* (2006.01)

(52) U.S. Cl.
CPC ............... *H02J 7/0019* (2013.01); *H02J 1/12* (2013.01); *Y02T 10/7055* (2013.01)

(58) Field of Classification Search
CPC ........... H02J 7/00; H02J 1/12; Y02T 10/7055
USPC ................ 320/103, 118, 119, 121, 122, 128; 307/46, 66, 54
See application file for complete search history.

(56) References Cited

U.S. PATENT DOCUMENTS

| | | | | |
|---|---|---|---|---|
| 5,418,445 A | * | 5/1995 | Alpert et al. | 320/160 |
| 5,553,138 A | * | 9/1996 | Heald et al. | 379/413 |
| 5,631,534 A | | 5/1997 | Lewis | |
| 6,624,612 B1 | * | 9/2003 | Lundquist | 320/118 |
| 7,612,530 B2 | | 11/2009 | Konishi et al. | |
| 8,350,413 B1 | * | 1/2013 | Tsukamoto | 307/71 |
| 8,466,657 B2 | * | 6/2013 | Buono et al. | 320/121 |
| 8,698,351 B2 | * | 4/2014 | Castelaz et al. | 307/25 |
| 8,860,371 B2 | * | 10/2014 | Yang | 320/116 |
| 8,928,190 B2 | * | 1/2015 | Karren et al. | 307/139 |

(Continued)

FOREIGN PATENT DOCUMENTS

| | | | | |
|---|---|---|---|---|
| JP | 2008-017605 A | | 1/2008 | |
| JP | 2009199830 A | * | 9/2009 | ............. H01M 2/10 |
| WO | WO 2008-097031 A1 | | 8/2008 | |

OTHER PUBLICATIONS

Wikipedia ("Galvanic Isolation", http://en.wikipedia.org/wiki/Galvanic_isolation, published Dec. 22, 2014, printed May 7, 2015, 3 pages).*

(Continued)

*Primary Examiner* — Phallaka Kik
(74) *Attorney, Agent, or Firm* — Hamilton, Brook, Smith & Reynolds, P.C.

(57) ABSTRACT

Adjacent battery cells connected in devices are balanced by closing a first circuit to charge an energy storage device from a first battery cell and thereafter simultaneously opening the first isolated switch and closing a second isolated switch to cause the energy storage device to charge a second battery cell. A circuit includes an isolated switch that operates simultaneously to balance battery cells connected in series, and a battery system balances battery modules connected in series, the battery module including battery cells connected in series. The battery cells and modules can be balanced by hierarchical balancing of modules of the battery pack and component cells of the modules.

26 Claims, 11 Drawing Sheets

(56) References Cited

U.S. PATENT DOCUMENTS

| | | | |
|---|---|---|---|
| 2003/0048150 A1* | 3/2003 | Clarke et al. | 333/101 |
| 2004/0085118 A1* | 5/2004 | Numata | 327/436 |
| 2005/0156566 A1* | 7/2005 | Thorsoe et al. | 320/116 |
| 2006/0012341 A1 | 1/2006 | Burns | |
| 2006/0022635 A1* | 2/2006 | Li et al. | 320/107 |
| 2006/0125443 A1* | 6/2006 | Bolduc | 320/104 |
| 2006/0246874 A1* | 11/2006 | Sullivan | 455/412.1 |
| 2009/0091294 A1* | 4/2009 | Gong et al. | 320/122 |
| 2010/0079108 A1* | 4/2010 | Monden et al. | 320/116 |
| 2010/0141208 A1* | 6/2010 | Deal et al. | 320/116 |
| 2010/0244773 A1* | 9/2010 | Kajouke | 320/137 |
| 2011/0156497 A1* | 6/2011 | Karren et al. | 307/139 |
| 2011/0227531 A1* | 9/2011 | Rajakaruna | 320/109 |
| 2012/0235494 A1* | 9/2012 | Verhaeven et al. | 307/77 |
| 2014/0084870 A1* | 3/2014 | Castelaz et al. | 320/118 |

OTHER PUBLICATIONS

International Search Report and Written Opinion from corresponding International Application No. PCT/US2012/051039 dated Feb. 28, 2013.

Notification Concerning Transmittal of Copy of International Preliminary Report on Patentability from corresponding International Applpication No. PCT/US2012/051039, "Method for Balancing Cells in Batteries," dated Mar. 13, 2014.

* cited by examiner

METHOD FOR BALANCING CELLS IN BATTERIES

RELATED APPLICATION

This application claims the benefit of U.S. Provisional Application No. 61/530,595, filed on Sep. 2, 2011.

The entire teachings of the above application are incorporated herein by reference.

BACKGROUND OF THE INVENTION

Battery packs composed of multiple cells can use internal electronics to assist in managing performance and safety issues. Individual cells can be connected in series to provide higher battery pack voltages for high voltage applications. For some applications, such as electric vehicles or utility-scale energy storage systems, the number of cells connected in series can be in the hundreds or even thousands of cells. Metal hydride cells, such as nickel metal hydride (NiMH), and lithium-based chemistries, such as Li-ion cells, are often used in these battery packs. However, NiMH and lithium-ion cells can be damaged or even explode if undercharged or overcharged. Although internal electronics can be employed to avoid exceeding safe voltages, currents and temperatures within the battery pack, individual cells arranged in a long series can be exposed to variations in local temperature during use, and the performance of individual cells may vary regardless, thereby significantly limiting the capacity of battery packs that employ individual cells in series.

Current methods for balancing a long series of cells often suffer from excessive energy loss during balancing, unreliable operation as a consequence of single-point failures, electronic circuit complexity, inefficient balancing when strings contain hundreds or thousands of cells, and inordinately long times to balance the cells in such strings.

Therefore, a need exists for methods and circuitry for balancing cells that overcome or minimize the above-referenced problems.

SUMMARY OF THE INVENTION

The invention generally is directed to a method and system for balancing cells in batteries.

In one embodiment, the invention is a method for balancing two adjacent battery cells arranged in series. The method includes closing a first isolated switch of a battery cell from which energy is to be transferred to thereby transfer energy from that battery to an energy storage device that is in electrical communication with a node connecting the negative terminal of a second battery cell to a positive terminal of the first battery cell, thereby charging the energy storage device, and then simultaneously opening the first switch and closing a second isolated switch, the second switch thereby causing energy to be transferred from the energy storage device to the second cell, whereby the second battery cell will have a voltage at least closer to that of the first battery cell. The energy storage device may be an inductor, and the first and second isolated switches may be, for example, opto-isolated switches, magnetic-isolated switches, or capacitive-isolated switches. In a further embodiment, the opto-isolated switches may be active opto-isolated switches.

In another embodiment, the invention is a circuit that includes first, second and third nodes, and a first isolated switch connecting the first and second nodes, the first and second nodes connectable to respective terminals of a battery cell. A second isolated switch connects the second node and the third node, the second and third nodes are connectable to respective terminals of a second battery cell. An energy storage device is connected to the second node, and a control unit is configured to operate the first and second switches to transfer energy from the first battery cell to the second battery cell via the energy storage device, the control unit opening the first switch simultaneously with closing of the second switch to thereby transfer energy from the energy storage device to the second battery cell. In further embodiments, the first and second switches may be opto-isolated switches that are powered by a node at a terminal of one of the first and second battery cells. Further embodiments may also include a DC-DC boost converter to power the first and second isolated switches.

In yet another embodiment, the invention is a battery system that includes a plurality of battery modules, each module including a string of battery cells, and a plurality of cell balancing circuits, each of the cell balancing circuits including a pair of switches and a control unit configured to operate the pair of switches to transfer energy between two adjacent cells in the string of battery cells, and a plurality of module balancing circuits, each of the module balancing blocks including a pair of switches and a control unit configured to operate the pair of switches to transfer energy between the two adjacent modules.

In still another embodiment, the invention is a method of hierarchical balancing of a plurality of battery modules, including the steps of balancing cells of a first battery module, balancing cells of a second battery module, and balancing the modules.

In yet another embodiment, the invention is a method for balancing battery modules that includes closing a first circuit of a first battery module from which energy is to be transferred to thereby transfer energy for that battery module to an energy storage device that is in electrical communication with a node connecting the negative terminal of a second battery module to a positive terminal of the first battery module, thereby charging the energy storage device, and simultaneously opening the first circuit and closing a second circuit, the second circuit thereby causing energy to be transferred from the energy storage device to the second battery module, whereby the second battery module will have a voltage at least closer to that of the first battery module.

In yet another embodiment, the invention is a method of balancing battery cells including the steps of detecting an energy imbalance between a first battery module and a second battery module, each of the modules including a plurality of battery cells, transferring energy from the first battery module to the second battery module such that the second battery module will have a voltage at least closer to that of the first battery module, detecting an energy imbalance between a first battery cell and a second battery cell of the second battery module upon distributing the energy from the first module among the battery cells of the second module, and transferring energy from the first battery cell to the second battery cell such that the second battery cell will have a voltage at least closer to that of the first battery cell. In further embodiments, a fault is detected at a cell-balancing circuit in the second module, the fault preventing energy transfer between the second battery cell and a third battery cell, and energy is transferred from a fourth battery cell to the third battery cell such that the third battery cell will have a voltage at least closer to that of the fourth battery cell.

The present invention has many advantages. For example, failure of a connection between any battery cell and a switch associated with balancing that cell does not prevent at least partial balancing of that cell, because overlapping switches for the cells can balance cells in either side of the fault, and overlapping switches for a module of which that battery is a component, can continue to be employed to balance the module relative to the other modules. Further, use of isolated switches causes transfer of energy between cells, particularly cells that are not adjacent to each other, to be faster than generally would be possible with other types of switches. Further still, the simultaneous opening and closing of the isolated switches by the method of the invention balances cells with substantially less forward voltage drop, enabling more efficient transfer of energy between cells than can occur by methods and circuits that do not employ active switching.

DETAILED DESCRIPTION OF THE INVENTION

Figure 1:
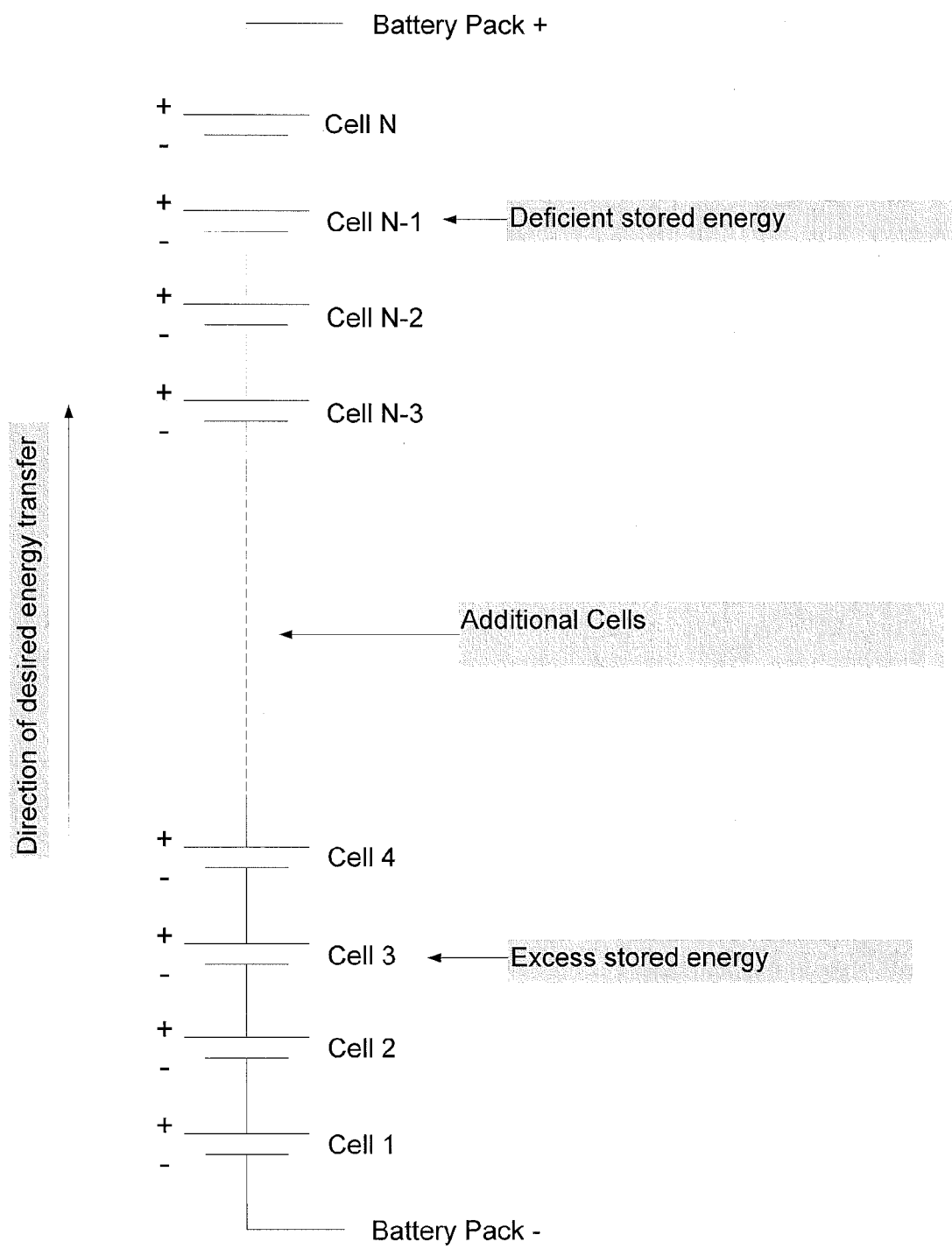
FIG. 1 is a circuit diagram of a large series battery cell string for which embodiments of the present invention may be implemented.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention provide for managing energy in a battery comprising of a large number of cells, such as the large series battery cell string shown in FIG. 1. More specifically, embodiments described below provide methods and devices for efficiently and reliably balancing cell capacity in a series of cells.

The amount of energy that can be obtained from a string of batteries in series, and the service life of the series as a whole, is dependant, in part, on "balancing" the individual battery cell capacities along the string. "Balance," as that term is defined herein, means equality of electrical capacities among cells in a battery module and among modules of a battery pack. The act of balancing cells involves transferring energy from some cells in the string to other cells; the "from" and "to" cells are determined by a particular cell balancing algorithm that accounts for characteristics such as the cells' voltage, current, internal impedance, temperature, or state of charge (SOC). Batteries and battery packs include circuitry to monitor individual cells and transfer of energy from and to cells, as determined by the particular cell balancing algorithm. In a long series of cells, such as the series shown in FIG. 1, where there could be hundreds or thousands of cells between cell #3 and cell #N−1, the balancing circuitry should ideally perform several functions. For example, during balancing, energy should be transferred quickly and efficiently between cell #3 through the intervening cells to cell #N−1. Also, the circuitry should be able to handle high voltage differences (e.g., voltage differences in excess of the "breakdown voltage" in transistors, such as a field-effect transistor (FET) or heterojunction bipolar transistor (HBT)) between cells that need to be balanced. Further, transfer of energy among multiple cell pairs should be simultaneous and, therefore, it is preferable to balance several pairs of cells in a battery pack simultaneously. Circuitry also should enable continued balancing of remaining cells in the event of a failure of any individual balancing circuit.

Figure 2:
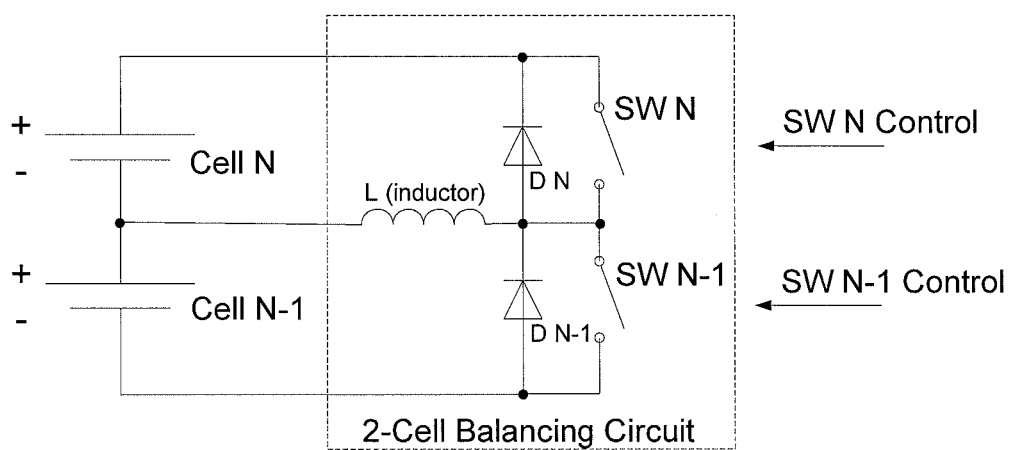
FIG. 2 is a circuit diagram of a prior art cell balancing block.

FIG. 2 is a circuit diagram of a prior art cell balancing block. In a common technique (illustrating a prior art technique as disclosed in U.S. Pat. No. 5,631,534 at FIG. 3, with respect to balancing circuit 10), switch SW N−1 is closed by SW N−1 Control, while switch SW N remains open (by not actuating SW N Control) and current flows through inductor L for a period of time needed to charge inductor L. The energy removed from cell N−1 is $L*I^2/2$ where L is the inductance in Henrys, and I is the peak current through the inductor. Next, switch SW N−1 is opened. Current flows through diode D N, while inductor L releases stored energy into cell N. Given an average current $I_{AVG}$ released through the inductor during the switching time period $t_{SW}$, this current flows into the top cell N across a potential difference of the cell voltage $V_C$ minus the forward voltage drop $V_F$ on diode D N.

Figure 3A:
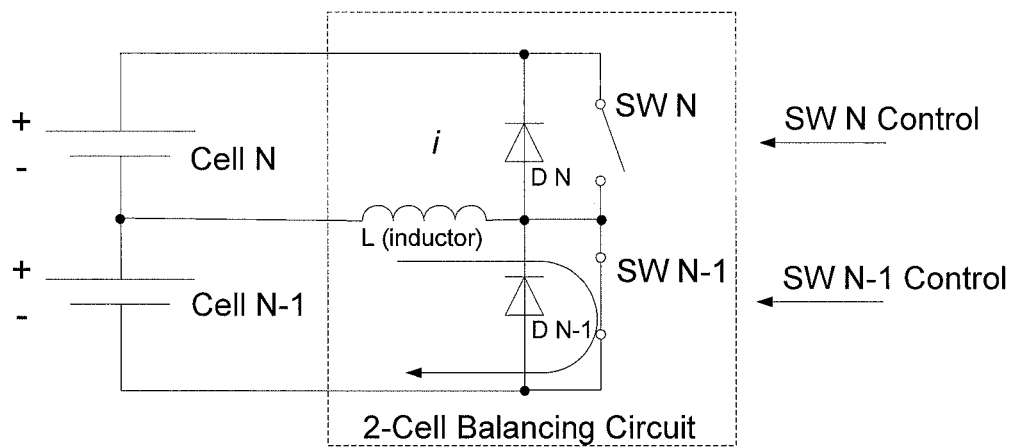
FIGS. 3A-B are circuit diagrams of a prior art cell balancing block operated in a synchronous manner.
Figure 3B:
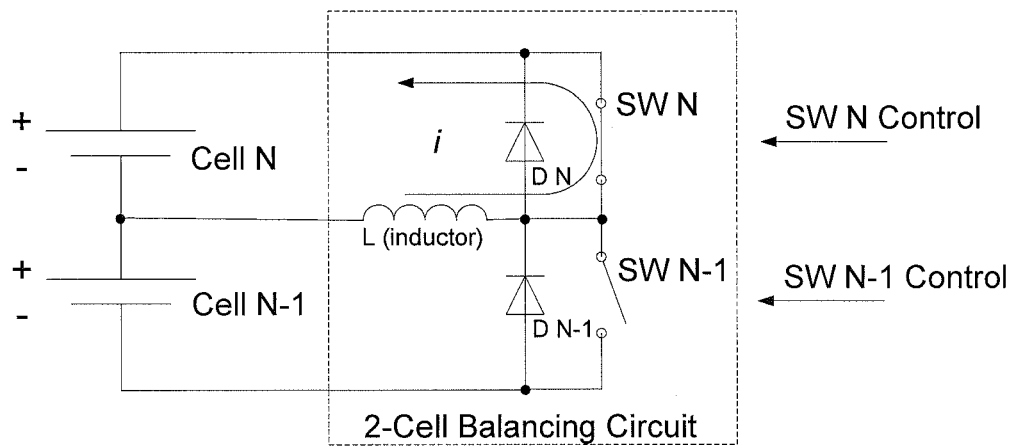

FIGS. 3A and 3B represent a prior art method of operating a cell balancing block in a synchronous manner. Switches SW N and SW N−1 (which may be implemented as respective transistors, such as a MOSFET) in the cell balancing block of FIGS. 3A and 3B are operated simultaneously. In order to transfer energy from cell N−1 to cell N, switch SW N−1 is first closed for a period of time required to store energy at inductor L, as shown in FIG. 3A. Next, as shown in FIG. 3B, switch SW N−1 is opened and switch SW N is closed simultaneously. Current I flows through the switch SW N, bypassing the diode DN 22. As a result, energy losses from current through the diode D N are prevented. The cell balancing block is bidirectional, meaning it may transfer energy from cell N to cell N−1 by operating the switches SW N and SW N−1 inversely to the operation described above. Because the diode D N is bypassed, the balancing circuit may transfer energy without diode D N, and is, therefore, generally more efficient because the forward voltage drop associated with diode D N is avoided. Thus, in alternative embodiments, the balancing circuit may omit diodes D N and D N−1.

Balancing circuits employed in one embodiment of the invention include digital isolators (also referred to as "isolated switches"), which are switches controlled by a signal that is galvanically isolated from the switch itself. Other examples of digital isolators include magnetic, capacitive, inductive, acoustic, and thermal isolators. Although the example embodiments described below employ opto-isolated switches, any form of digital isolators can be incorporated as one or more of the switches in a cell balancing circuit of the invention, as described below with respect to FIGS. 4-7.

Figure 4:
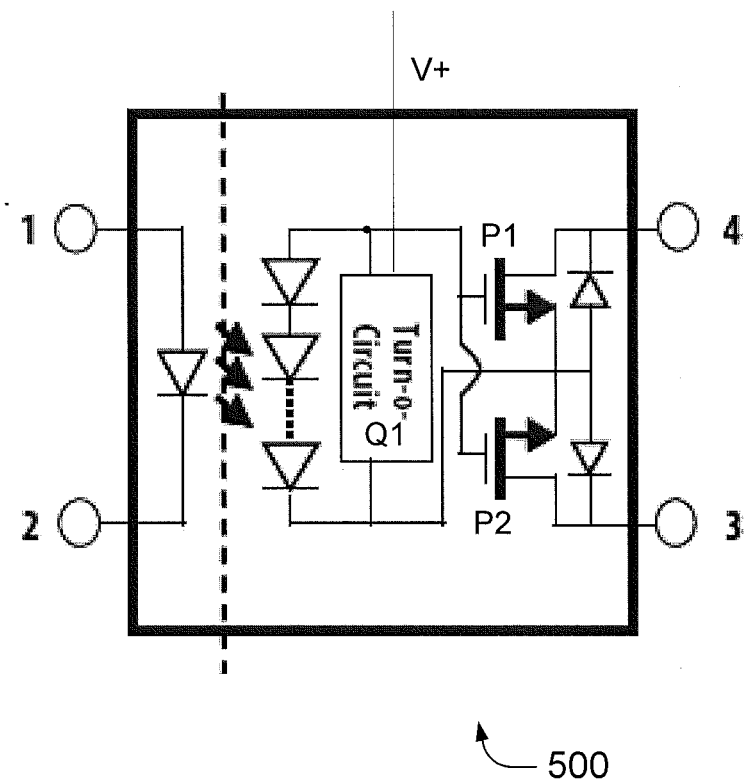
FIG. 4 is a circuit diagram of an active optically isolated bi-directional switch.

FIG. 4 is a circuit diagram of a prior art active (i.e., externally powered) optically isolated bi-directional switch 500 ("opto-isolated switch"), which is powered by external low-voltage power source V+ and includes a light emitting diode, a high-speed photovoltaic diode array and driver circuit Q1 to switch on and off two second stage high voltage power transistors P1, P2 at the output of the switch. The driver circuit Q1 includes a noise-suppression trigger circuit, a transistor switch, and a capacitor. When an input signal illuminates the light emitting diode and exceeds a particular threshold, the photovoltaic diode array causes the transistor to turn on and commences charging of the capacitor. The driver circuit Q1 can employ an external power source to increase the charging speed of the capacitor and hence reduce the turn-on time. A trigger circuit connected to the output of the capacitor and when its charge reaches a level necessary to operate the trigger, the power transistors P1 and P2 are driven at the output of the switch. This mechanism is in contrast to a passive approach, whereby the light emitting diode drives a photovoltaic diode array or phototransistor that operates the output transistors directly, resulting in longer turn-of or turn-off times because the charging current source is only the photocurrent in the diode array or phototransistor.

Optically-isolating switching enables relatively simple and low voltage switch drive electronics. As a result, an opto-isolated switch enables switch control of very high voltage battery packs to be operated at relatively low voltage, thus requiring only relatively simple and inexpensive electronics in a battery management system (BMS). In such an application, the BMS can control opto-isolated switches in a balancing circuit that opens and closes switches simultaneously, as in the present invention.

Opto-isolated switches can take several forms. An example of a self-contained 4-terminal opto-isolated switch (not shown) is based on a Light Emitting Diode (usually Infrared) and a string of photo-diodes that produce ~0.6V potential each. The photo-diodes, when illuminated by the LED, create a small current that charges the gate capacitance of the MOSFET switch pair, and turn MOSFETs "on," closing the switch. One drawback of the above topology (a "passive" switch topology, due to the switching occurring without an external power source) is slow turn-on and turn-off times due to low current generated by photo-diodes coupled with high gate capacitance of the MOSFETs. Typical switching times range from ~0.2-0.3 mS to 5-20 mS, depending on the MOSFET's pair maximum current (e.g., a typical isolated switch, such as Avago Technologies part number ASSR-1510).

By employing an external power source V+, the active opto-isolated switch 500 in FIG. 4 enables fast switching times (e.g., from ~50-100 nS (nano-second) to 5-10 μS (micro-second)). As a result, the peak current that is charging the gate capacitance can be increased by several orders of magnitude. Because V+ can be derived from the positive terminal of an adjacent cell, V+ is available for all switches except a switch at the top-most cell in the string.

Figure 5:
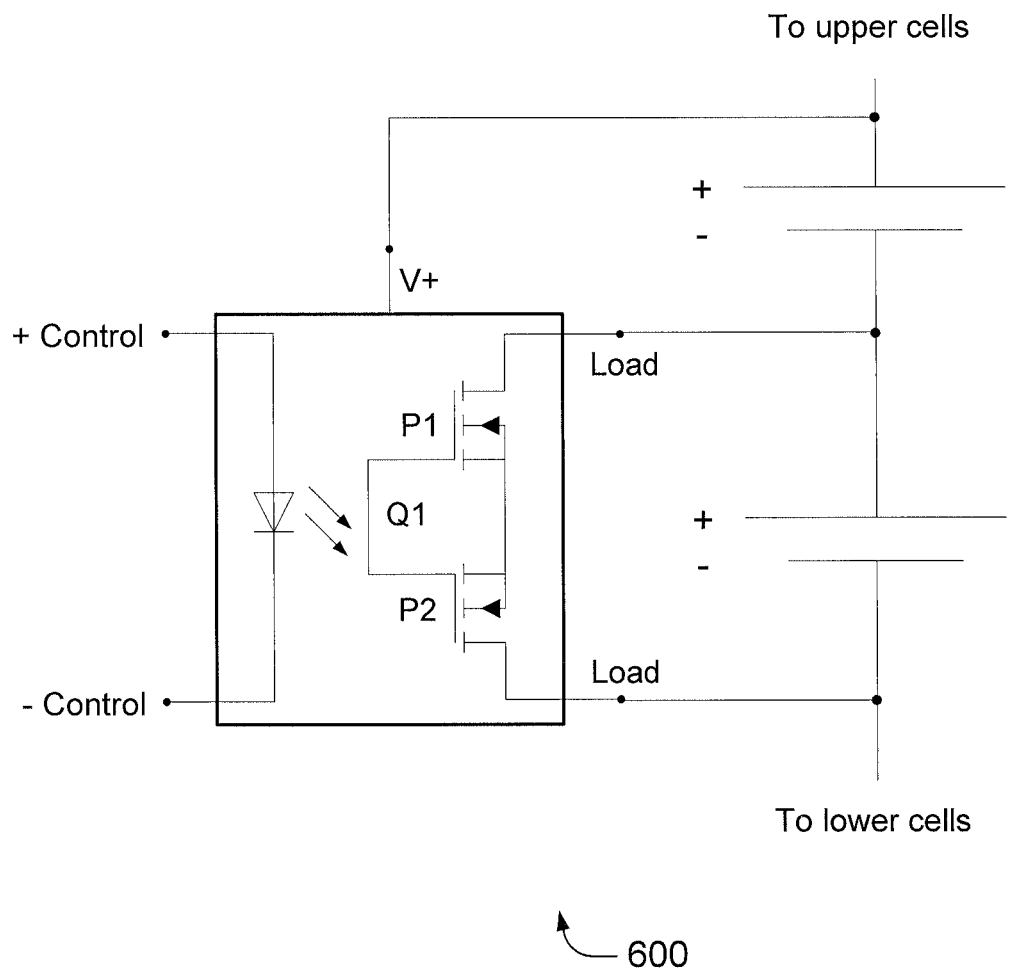
FIG. 5 is a circuit diagram of a prior art active optically isolated switch configured to receive power from a series of cells.
Figure 6:
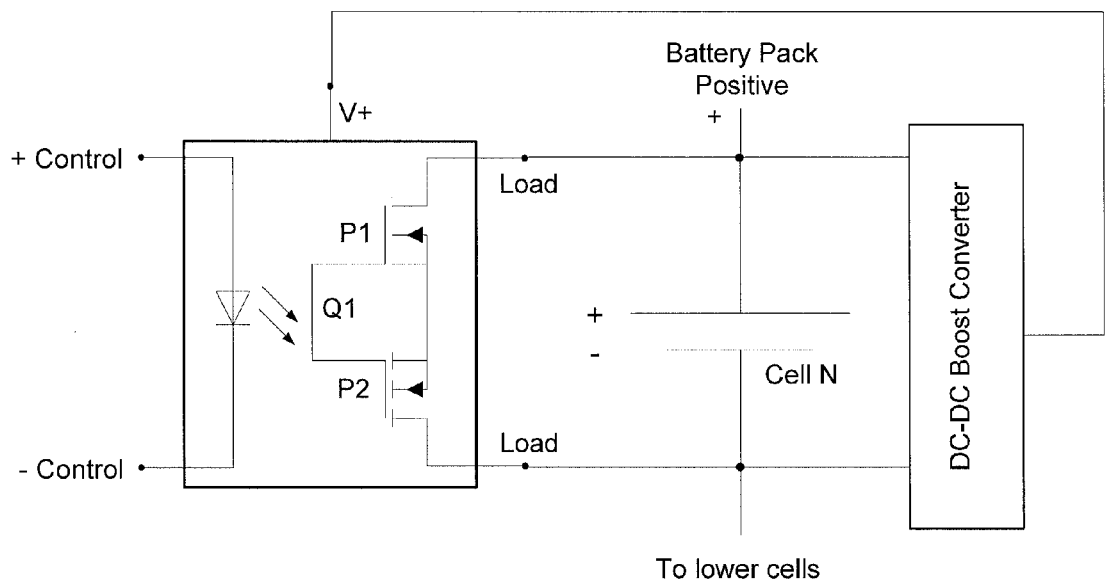
FIG. 6 is a circuit diagram of an active optically isolated switch configured with a boost DC-DC converter.

FIG. 5 is a circuit diagram of an active opto-isolated switch 600 (equivalent to the switch 500 of FIG. 4) configured to receive power from a series of cells. A node V+ located between two cells of a larger cell string is connected to power the active opto-isolated switch. Optical isolation of switch control and borrowing V+ voltage from the upper cells allows for simple and low voltage battery management system electronics. In order to power the active opto-isolated switch connected to the top-most cell in a string, a boost DC-DC converter can be employed to provide V+ voltage, as shown in FIG. 6.

Figure 7:
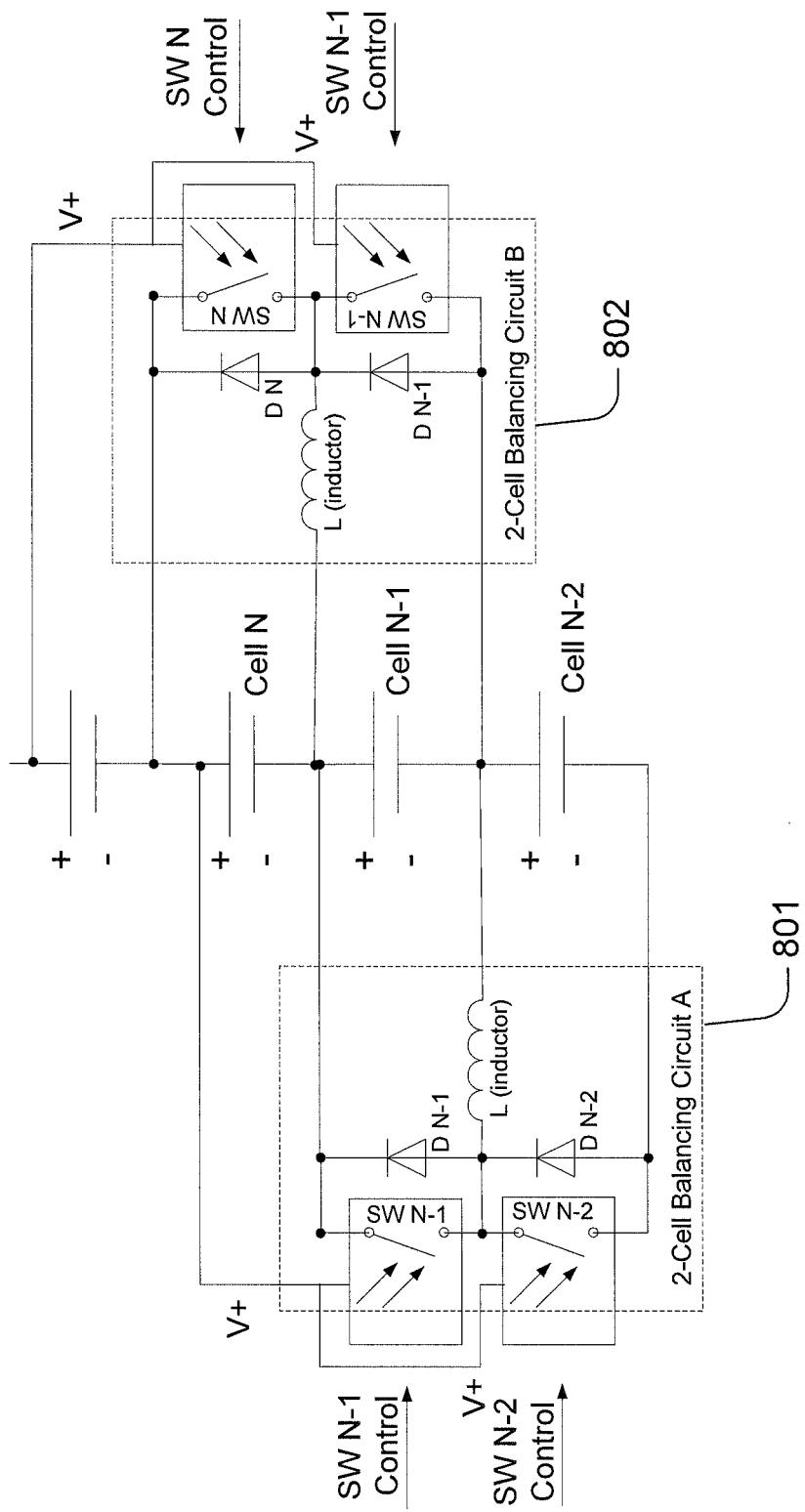
FIG. 7 is a circuit diagram of two cell balancing circuits employing opto-isolated switches and synchronous operation of the invention.

FIG. 7 is a circuit diagram of a pair of 2-cell balancing blocks employing opto-isolated switches and simultaneous operation to balance cells N−2 through N of a series of battery cells, according to an embodiment of the invention. The balancing circuits, balancing block A 801 and balancing block B 802, each include a pair of active opto-isolated switches, as described above with reference to FIGS. 5-7. Further, pairs of the switches are operated simultaneously, as described above with reference to FIG. 3. Cell balancing circuit block A 801 provides energy transfer between Cell N−1 and N−2. Similarly, cell balancing circuit block B 802, when overlapped with Cell N−1, provides energy transfer between Cell N−1 and N−2. Using a similar overlapping technique in the cell balancing blocks, energy may the transported from a given cell to adjacent cells up or down the string. By combining the features of simultaneous switching and employment of opto-isolated switches, the 2-cell balancing block improves efficiency in energy transfer.

Figure 8A:
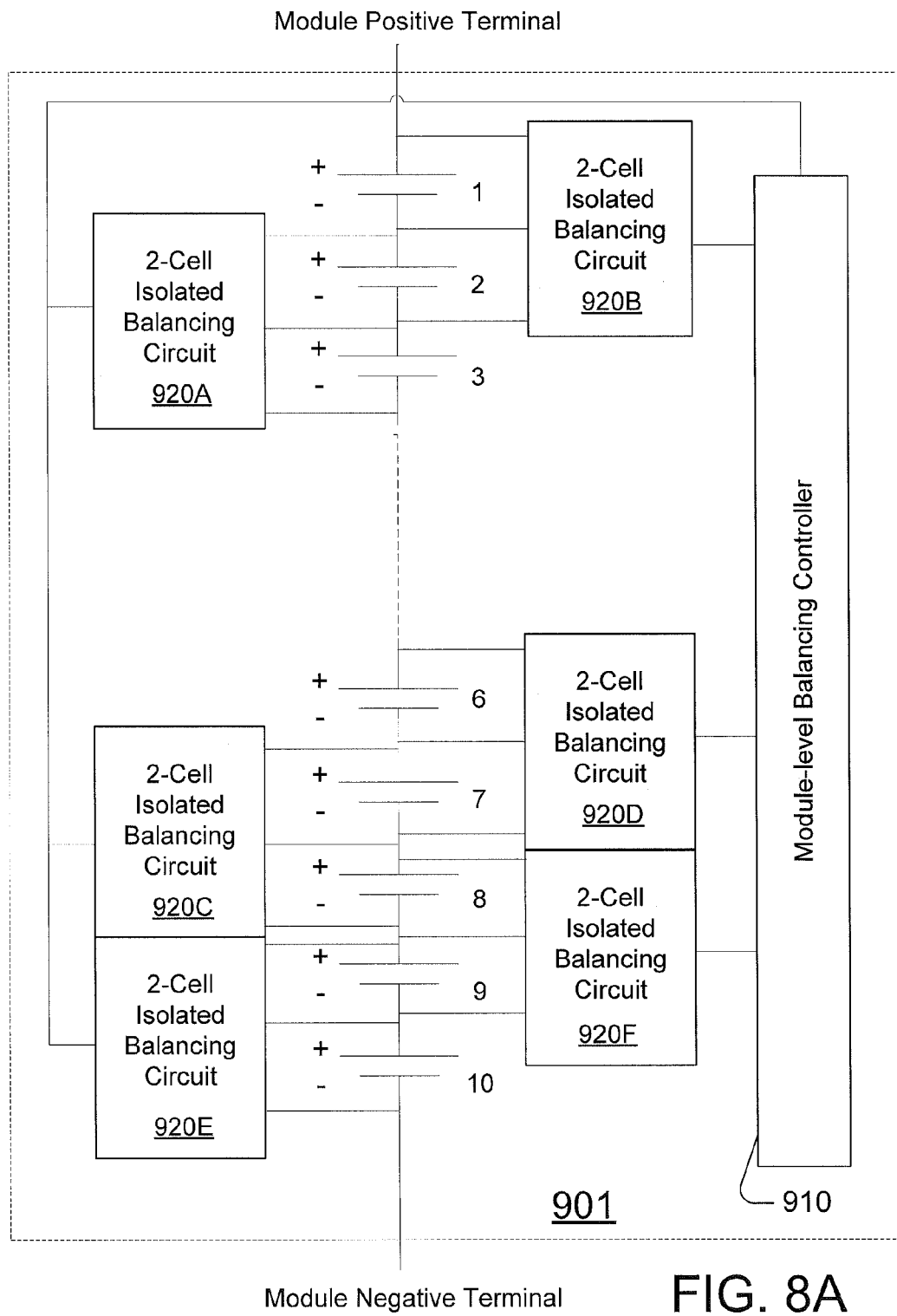
FIG. 8A is a block diagram of a battery module comprising a plurality of cell balancing circuits and control electronics of the invention.

FIG. 8A is a block diagram of a battery module 901 in an example embodiment of the invention. As a result of the improved efficiency described above, the module may consist of 12-16 cells or cell-blocks (wherein each cell is substituted with multiple cells arranged in parallel), with cell balancing configured to transfer energy across the entire module. Multiple modules (e.g., up to 12-16) can be connected together to form a complete battery, or battery pack, as described below with reference to FIG. 8B.

A module-level balancing controller 910 controls operation at each of the cell balancing circuits 920A-F. In particular, the controller 910 may provide control signals to the respective opto-isolated switch control inputs to provide simultaneous operation of the cell balancing circuits as described above with reference to FIGS. 3A and 3B. Further, the controller 910 may receive one or more measurements regarding the cells (e.g., voltage, current, internal impedance, temperature, state of charge) and operate an algorithm to determine and initiate cell-balancing operations at each of the cell balancing circuits 920A-F. An example cell-balancing algorithm is described below with reference to FIG. 9A.

Figure 8B:
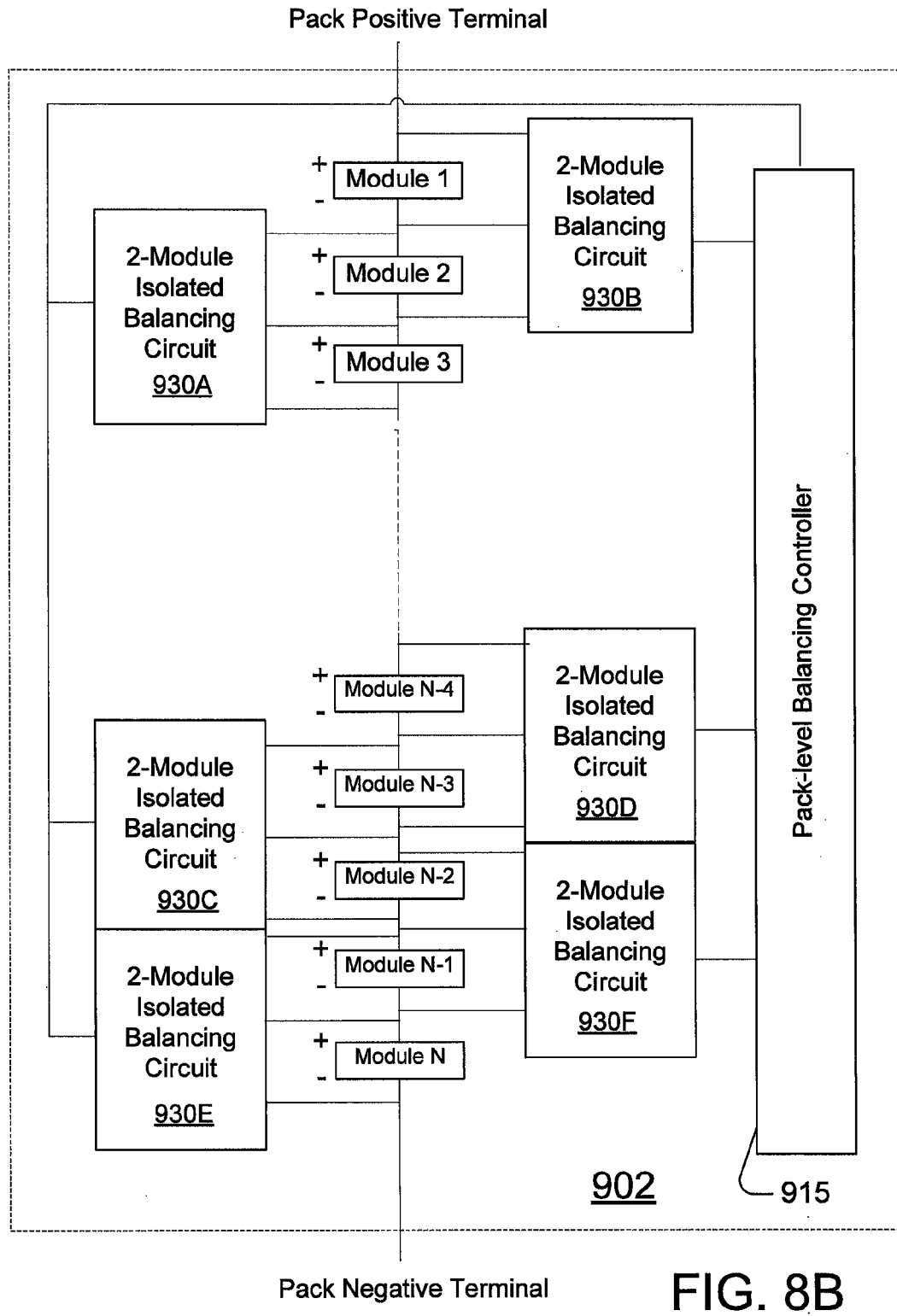
FIG. 8B is a block diagram of a battery pack comprising a plurality of module balancing circuits and control electronics of the invention.

FIG. 8B is a block diagram of a battery pack 902 comprising a plurality of modules for which module balancing circuits can be employed to provide balancing between modules, according to a further embodiment of the invention. In addition, each of the modules can also employ cell balancing, as described above with reference to FIG. 9A, thereby providing cell balancing in a hierarchical manner. Balancing electronics 930A-F for each pair of modules can configured in a manner similar to the cell-balancing blocks described above, with a similar or identical circuit topology, yet may be configured for 12-16 times higher voltage to accommodate the higher module voltage. While each 2-module balancing circuit must be designed for higher voltage, the energy transfer requirements can be more modest, due to a large number of cells averaging their capacity and internal impedance within each module. At a constant temperature uniformly distributed across a battery pack of modules, the difference in stored energy between any two modules can be relatively small, and can be smaller than the difference between any two cells in the battery. However, due to a possibility of large variation in thermal conditions across a battery pack relative to that of a single cell or module, module balancing can be beneficial to correct such differences.

A pack-level balancing controller 915 controls operation at each of the module balancing circuits 930A-F. In particular, the controller 915 can provide control signals to the respective module-level balancing circuits (e.g., directly to the opto-isolated switch control inputs of the module-balancing circuits) to control simultaneous operation of the module balancing circuits as described above. Further, the controller 915 can receive one or more measurements regarding the modules (e.g., voltage, current, internal impedance, temperature, state of charge) and operate an algorithm to determine and initiate module-balancing operations at each of the module balancing circuits 930A-F. An example of a module-balancing algorithm is described below with reference to FIG. 9B.

A balancing system combining cell balancing and module balancing, as described above with reference to FIGS. 8A and 8B, is an improvement over prior art methods because it enables simultaneous, hierarchical balancing (i.e., between cells within a module and between modules), in contrast to nonhierarchical, sequential balancing.

Figure 9A:
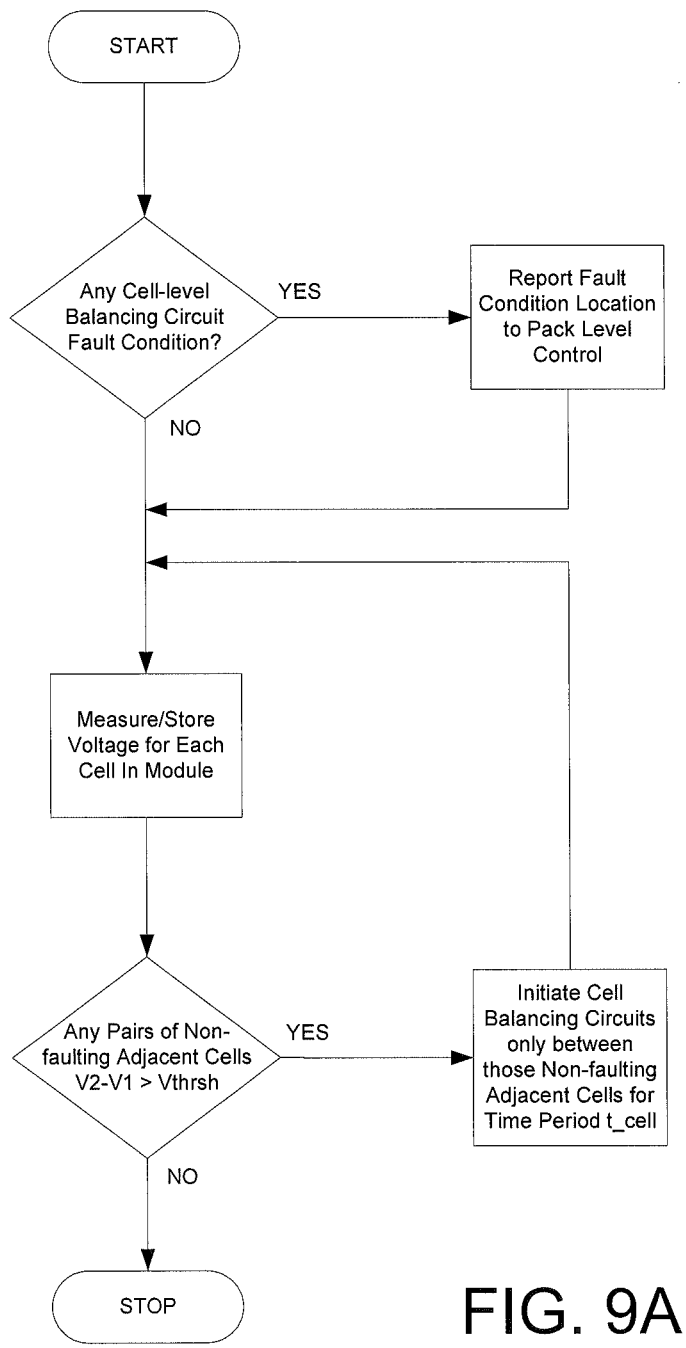
FIG. 9A is a flow diagram of an algorithm for balancing cells within a battery module of the invention.
Figure 9B:
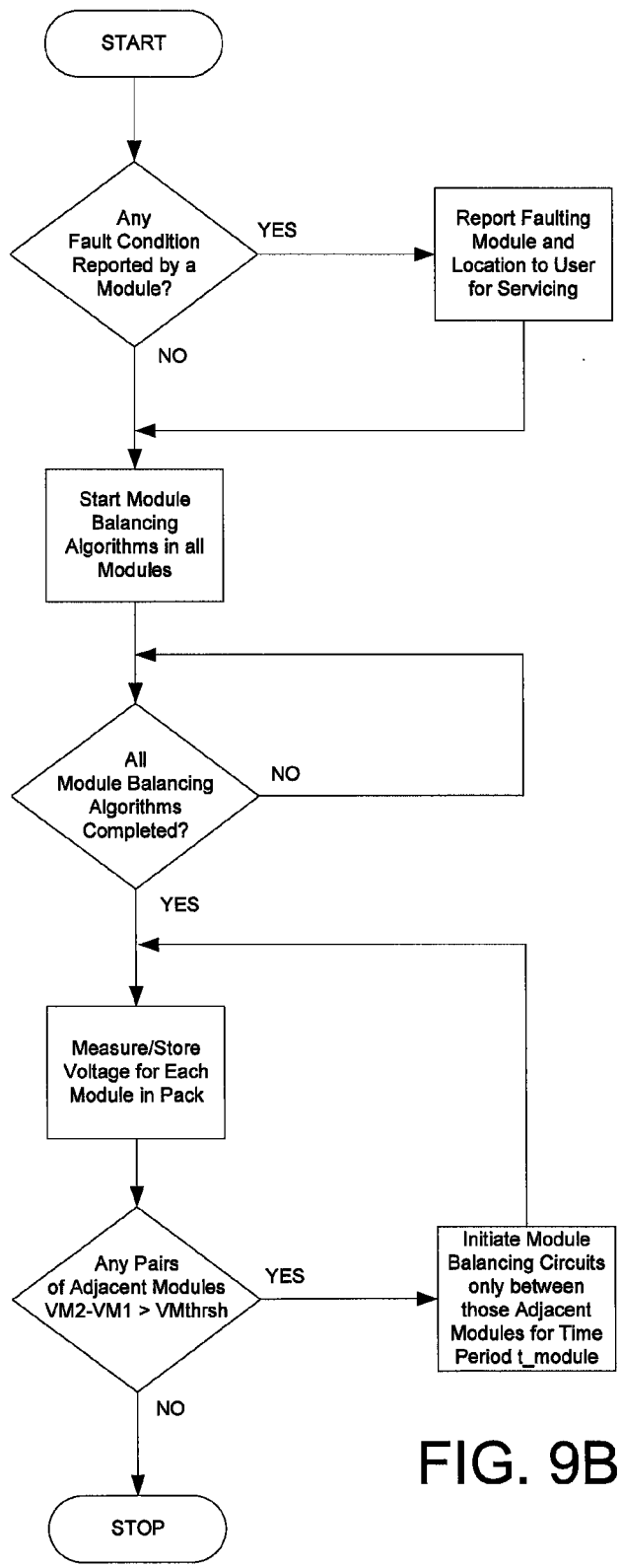
FIG. 9B is a flow diagram of an algorithm for balancing modules within a battery pack of the invention.

FIGS. 9A and 9B are flow diagrams of algorithms for balancing cells within a battery module and for balancing battery modules within a battery pack, respectively. Both algorithms can be implemented, in a hierarchical configuration, by employing controllers of a battery module or battery pack employing simultaneous switching and opto-isolated switches as described above with reference to FIGS. 3-8B. Grouping regions of cells into modules allows for hierarchical balancing. In further embodiments, modules can be further grouped into super-modules and further balanced using the same principles, forming hierarchical levels beyond the module-level and pack-level balancing described above. A balancing algorithm can operate as follows, during both charge and discharge cycles:

1. Balance cells within each module (e.g., FIG. 9A) to achieve regional (i.e., module-level) balance. Balancing for modules 1, 2, 3 . . . N occurs simultaneously.
2. Stop cell balancing within each module.
3. Balance modules within the entire battery pack (e.g., FIG. 9B) to achieve better overall balance. Balancing of modules 1, 2, 3 . . . N would proceed concurrently and simultaneously.
4. Repeat steps 1, 2, and 3 continuously, periodically, or in response to an event. The cell voltage, state of charge (SOC), temperature and other parameters may determine when balancing of cells, modules, or both are initiated.

FIG. 9A is a flow diagram of an algorithm for balancing cells within a battery module, which can be operated by a module-level balancing controller. On initialization, it is determined whether any of the cell balancing circuits under control of the controller are exhibiting a fault condition. If so, the fault condition is reported, e.g., to a pack-level controller or other logic of a BMS. Otherwise, the voltage of each cell in the module is measured. The difference between pairs of non-faulty adjacent cells is calculated (e.g., V2–V1), and that difference is compared against a threshold value (e.g., Vthrsh). If the voltage difference for a given pair of cells is greater than the threshold value (e.g., V2–V1>Vthrsh), then the respective cell balancing circuit is initiated to transfer energy from the cell having more energy to the cell having less energy. The algorithm can be repeated continuously, periodically, or in response to an event, and the cell voltage, state-of-charge (SOC), temperature and other parameters can determine when the algorithm is initiated.

FIG. 9B is a flow diagram of an algorithm for balancing modules within a battery pack, which can be operated by a pack-level balancing controller. On initialization, it is determined whether any of the modules are reporting a fault condition. If so, the fault condition is reported, specifying the faulty module, to a user for servicing. Otherwise, the module-level cell balancing algorithm (e.g., FIG. 9A) is initiated for each of the modules in the battery pack. Upon completion of the module-level balancing, the voltage of each module in the pack is measured. The difference between pairs of adjacent modules is calculated (e.g., VM2–VM1), and that difference is compared against a threshold value (e.g., VMthrsh). If the voltage difference for a given pair of modules is greater than the threshold value (e.g., VM2–VM1>VMthrsh), then the respective module balancing circuit is initiated to transfer energy from the module having more energy to the module having less energy. The algorithm can be repeated continuously, periodically, or in response to an event, and the module voltage, SOC, temperature and other parameters may determine when the algorithm is initiated.

A hierarchical balancing system as shown in FIGS. 8A-B may be configured to compensate for a fault condition in one of the 2-cell opto-isolated balancing circuits 920 A-F by conducting a module-to-module transfer as described in the following example. For example, in a battery pack comprised of modules as illustrated in FIG. 9B, where N=10, assume that within module 2 (FIG. 8B), the 2-Cell Balancing circuit 920A (FIG. 8A) is non-operational due to a damaged power transistor P1, P2 in one of its opto-isolated switches (FIG. 4). Balancing energy transfer is required to move excess energy to or from the module that includes the fault condition. As a result of the fault condition, and using prior art techniques, no balancing energy transfers are possible across the faulty circuit, hence forming a break within the module and within the battery pack. With the balancing circuitry of FIGS. 8A-B it is possible to compensate for this fault condition. At the module level, specifically, module balancing circuit 930A operates to transfer energy from module 2 to adjacent module 3. When energy is transferred from module 2 to module 3, energy from all cells in module 2 (including the overcharged top most cell) is transferred to module 3. The amount of energy transferred to each cell in module 3 is dependent on the relative impedance of each of the cells. If all of the cells have approximately the same impedance, each will receive an equal portion of the energy. However, typical cells in a module exhibit different levels of impedance, particularly after the cells have been cycled and aged for some time. Thus, cells with greater impedance would obtain less charge, while cells of lower impedance would obtain more charge. After module balancing circuit 930A completes a transfer between modules 2 and 3, the transferred energy is available for balancing cells in module 3. Thus, using a module-level transfer, energy can be transferred despite the fault condition.

Referring to FIG. 8A, the following example shows how energy may be transferred between two distant (non-adjacent) cells in a ten (10) cell module. Assume that the top-most cell in module 901 shown in FIG. 8A has excess energy, and the bottom-most cell in FIG. 8A is deficient in energy. Further assume that there are no fault conditions within the module. The module balancing algorithm shown in FIG. 10A is activated by the module balancing controller 910. According to the algorithm, all cell voltages are measured and stored by the controller. Next, two pairs of cells are identified as having a voltage difference greater than the threshold. These pairs are the top most pair 1-2, where the voltage of overcharged cell 1 is larger than the voltage of cell 2, and the bottom most pair 9-10, where the voltage of cell 9 is larger than the voltage of undercharged cell 10. The algorithm proceeds to initiate an energy transfer from cell 1 to 2, and a transfer from cell 9 to cell 10. The module algorithm iterates and all cell voltages are again measured and stored. A voltage imbalance is now detected between cell pairs 1-2, 2-3, 8-9, and 9-10. Similarly, charge is transferred between the imbalanced cell pairs, but since two cells, namely cell 2 and cell 9, are each transferring to both of their adjacent cells, they are only required to transfer approximately half as much energy in either direction to achieve the required voltage change. This results in a spreading and smoothing action where energy is moved from cells of higher energy to cells of lower energy. In subsequent iterations of the algorithm, energy is similarly transferred across the string averaging and smoothing between the cells to achieve a balanced string.

While this invention has been particularly shown and described with references to example embodiments thereof, it will be understood by those skilled in the art that various changes in form and details may be made therein without departing from the scope of the invention encompassed by the appended claims.

What is claimed is:

1. A method for balancing two adjacent battery cells arranged in series, comprising the steps of:
    a) closing a first isolated switch of a first battery cell from which energy is to be transferred to thereby transfer energy from that battery to an energy storage device that is in electrical communication with a node connecting a negative terminal of a second battery cell to a positive terminal of the first battery cell, thereby charging the energy storage device; and thereafter
    b) simultaneously opening the first isolated switch and closing a second isolated switch, the second isolated switch thereby causing energy to be transferred from the energy storage device to the second cell, whereby the second battery cell will have a voltage at least closer to that of the first battery cell.

2. The method of claim 1, wherein the energy transfer is to and from an energy storage device that is an inductor.

3. The method of claim 1, wherein the first and second isolated switches are at least one member selected from the group consisting of an opto-isolated switch, a magnetic-isolated switch, and a capacitive-isolated switch.

4. The method of claim 1, wherein the first and second isolated switches are opto-isolated switches.

5. The method of claim 4, wherein the opto-isolated switches are active opto-isolated switches.

6. A battery system comprising:
    a) a plurality of battery modules, each module including:
        i) a string of battery cells, and
        ii) a plurality of cell balancing circuits, each of the plurality of cell balancing circuits including a pair of isolated switches and a control unit configured to operate the pair of switches to transfer energy between two adjacent cells in the string of battery cells; and
    b) a plurality of module balancing circuits, each of the module balancing circuits including a pair of isolated switches and a control unit configured to operate the pair of switches to transfer energy between two adjacent battery modules.

7. The battery system of claim 6, wherein the pair of switches at each of the cell balancing circuits is a pair of isolated switches.

8. The battery system of claim 6, wherein the first and second isolated switches are at least one member selected from the group consisting of an opto-isolated switch, a magnetic-isolated switch, and a capacitive-isolated switch.

9. The battery system of claim 6, wherein the first and second isolated switches are opto-isolated switches.

10. The battery system of claim 9, wherein the opto-isolated switches are active opto-isolated switches.

11. The battery system of claim 6, wherein at least one of the pairs of switches are powered through a node at a terminal of one of the first and second battery cells.

12. The battery system of claim 6, further comprising a DC-DC boost converter connected to the respective nodes of at least one cell and to switch corresponding to said at least one cell, whereby the DC-DC boost converter powers at least one of said switches.

13. The battery system of claim 6, wherein each of the cell balancing circuits includes an energy storage device for storing energy during an energy transfer between the two adjacent cells.

14. The battery system of claim 13, wherein the energy storage device is an inductor.

15. A method of hierarchical balancing of a plurality of battery modules, comprising:
    a) balancing cells of a first battery module;
    b) balancing cells of a second battery module; and
    c) balancing the modules, including the steps of:
        closing a first circuit of the first battery module from which energy is to be transferred to thereby transfer energy from that battery module to an energy storage device that is in electrical communication with a node connecting a negative terminal of the second battery module to a positive terminal of the first battery module, thereby charging the energy storage device; and thereafter
        simultaneously opening the first circuit and closing a second circuit, the second circuit thereby causing energy to be transferred from the energy storage device to the second battery module, whereby the second battery module will have a voltage at least closer to that of the first battery module.

16. A method for balancing battery modules, comprising the steps of:
    a) closing a first circuit of a first battery module from which energy is to be transferred to thereby transfer energy from that battery module to an energy storage device that is in electrical communication with a node connecting a negative terminal of a second battery module to a positive terminal of the first battery module, thereby charging the energy storage device; and thereafter
    b) simultaneously opening the first circuit and closing a second circuit, the second circuit thereby causing energy to be transferred from the energy storage device to the second battery module, whereby the second battery module will have a voltage at least closer to that of the first battery module.

17. The method of claim 16, wherein the circuits of the first and second battery modules are closed and opened by first and second opto-isolated switches.

18. The method of claim 17, wherein the first and second opto-isolated switches are powered by a node at a terminal of one of the first and second battery cells.

19. The method of claim 18, further comprising a DC-DC boost converter, the first and second opto-isolated switches being powered by the DC-DC boost converter.

20. A method of balancing battery cells, comprising:
    detecting an energy imbalance between a first battery module and a second battery module, each of the modules including a plurality of battery cells;
    transferring energy from the first battery module to the second battery module such that the second battery module will have a voltage at least closer to that of the first battery module;
    detecting an energy imbalance between a first battery cell and a second battery cell of the second battery module upon distributing the energy from the first module among the battery cells of the second module; and transferring energy from the first battery cell to the second battery cell such that the second battery cell will have a voltage at least closer to that of the first battery cell.

21. The method of claim 20, wherein transferring energy from the first battery cell to the second battery cell includes the steps of:
   a) closing a first isolated switch of a first battery cell from which energy is to be transferred to thereby transfer energy from that battery to an energy storage device that is in electrical communication with a node connecting a negative terminal of a second battery cell to a positive terminal of the first battery cell, thereby charging the energy storage device; and thereafter
   b) simultaneously opening the first isolated switch and closing a second isolated switch, the second isolated switch thereby causing energy to be transferred from the energy storage device to the second cell, whereby the second battery cell will have a voltage at least closer to that of the first battery cell.

22. The method of claim 21, wherein the first and second isolated switches are at least one member selected from the group consisting of an opto-isolated switch, a magnetic-isolated switch, and a capacitive-isolated switch.

23. The method of claim 21, wherein the first and second isolated switches are opto-isolated switches.

24. The method of claim 23, wherein the opto-isolated switches are active opto-isolated switches.

25. The method of claim 20, further comprising detecting a fault at a cell-balancing circuit in the second module, the fault preventing energy transfer between the second battery cell and a third battery cell.

26. The method of claim 25, further comprising transferring energy from a fourth battery cell to the third battery cell such that the third battery cell will have a voltage at least closer to that of the fourth battery cell.

* * * * *